UNITED STATES PATENT OFFICE.

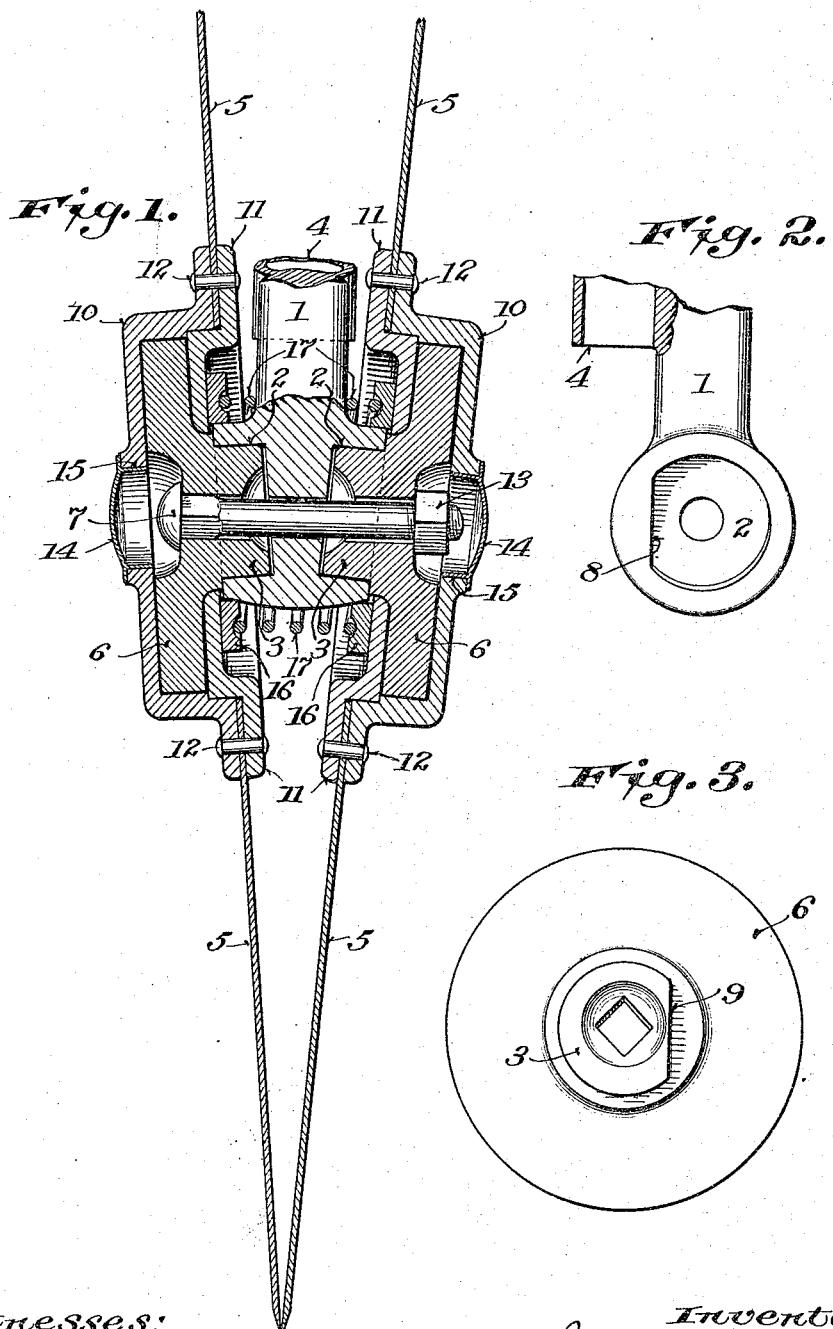

JOSEPH P. OFFERMAN, OF BEAVER DAM, WISCONSIN.

BEARING FOR DISK SEEDERS.

1,196,972.  Specification of Letters Patent.  Patented Sept. 5, 1916.

Application filed April 12, 1915. Serial No. 20,658.

*To all whom it may concern:*

Be it known that I, JOSEPH P. OFFERMAN, a citizen of the United States, residing at Beaver Dam, county of Dodge, and State of Wisconsin, have invented new and useful Improvements in Bearings for Disk Seeders, of which the following is a specification.

My invention relates to improvements in that class of disk seeders in which two disks, one located on each side of the seeder duct and shank converge toward each other in front of said duct and shank, and it pertains, more especially among other things, to the device for revolubly supporting each pair of disks connected with a single duct and shank therefrom.

My invention is explained by reference to the accompanying drawings, in which—

Figure 1 represents a sectional view of the disks, a portion of the supporting shank and the mechanism for connecting said disk to said shank. Fig. 2 represents a side view of a portion of the disk supporting duct and shank with the disk and supporting mechanism removed, and Fig. 3 is a side view of the disk supporting hub.

Like parts are referred to by the same reference numerals throughout the several views.

1 represents the lower end of the shank which is provided on two opposing sides with recesses 2, 2, for the reception of the stationary hubs 3, 3. It will be understood that as usually constructed a grain duct 4 is formed integrally with the upper portion of the shank 1, whereby grain is led to and adapted to drop in a furrow or groove formed in the soil by the two converging disks 5, 5. The hubs 3 comprise not only that portion located within the recess 2 of the shank, but also comprise the disks 6, 6, which are respectively located upon the exterior sides of said disks 5, the hubs 3 and disks 6 being formed integral, as shown in Fig. 1 and rigidly clamped to the lower end of the shank 1 by the bolt 7. One side of the recesses 2 is provided with an angular bearing 8, which is adapted to fit against the angular bearing 9 of the stationary member 6 whereby said hub and member 6 are prevented from revolving, both of such members being rigidly clamped by said bolt 7, as stated to the lower end of said shank. The disks 5, 5 are each revolubly connected with the hub through the members 10, 10, and 11,11, and said members are rigidly secured to said disks by a plurality of rivets 12, 12. The members 10 and 11 are revolubly supported upon the stationary member 6 of said hub around which they are adapted to revolve as the seeder is drawn forwardly. It will be understood that the periphery of the members 6, located upon the exterior sides of said disks 5, have a tendency to cause said disks 5, as they are driven forwardly in contact with the ground, to incline toward each other, as shown in Fig. 1, while the angular position of said hub and member 6 is such that said disks are normally retained in the inclined position, shown in said figure. When said hubs have been rigidly clamped to the lower end of said shank 1 by turning down the nut 13 on said bolt 7 the caps 14 are inserted in the apertures 15. whereby dust is prevented from entering said aperture and coming in contact with said bolt and the moving surfaces of the mechanism surrounding said hub.

16, 16 are packing rings, which are retained in close contact with the respective supporting members 11 by the expansive action of the coiled spring 17, one end of said spring being caused to bear against one of said packing rings, while the opposite end is retained against the other packing ring, whereby both of said packing rings are retained, as stated, in yielding contact with the members 11 by the expansive action of a single spring.

Having thus described my invention, what I claim as new and desire to secure by Letters Patent, is:—

1. In a device of the described class, the combination with the lower end of a shank provided upon two opposing sides with hub receiving recesses, and also provided with a bolt receiving aperture extending from one of said recesses to the other, a stationary hub located in each of said recesses, a stationary bearing disk formed integral with each of said hubs, a pair of revoluble disks, a pair of plates rigidly secured to the respective sides of each of said revoluble disks, each pair of plates being revolubly supported from each of said bearing disks, one of each pair of plates being located one upon one side and one upon the opposite side of said stationary bearing disk, a clamping bolt extending at right angles directly through said hubs and bolt receiving aperture formed in said shank, said bolt being adapted to rigidly secure said stationary hubs and integrally formed disks to the lower end of said shank, said shank being provided with angular bearings adapted to bear against the angular bearings of said hubs, whereby said hubs are prevented from revolving.

2. In a device of the described class, the combination with the lower end of a shank provided upon two opposing sides with hub receiving recesses, and also provided with a bolt and bolt receiving aperture extending from one of said recesses to the other, a stationary hub located in each of said recesses, means for preventing said hub from revolving in said recesses, a stationary bearing disk formed integral with each of said hubs, a pair of revoluble disks, a pair of plates rigidly secured to the respective sides of each of said revoluble disks, each pair of plates being revolubly supported from each of said bearing disks, one of each pair of plates being located one upon one side and one upon the opposite side of said stationary bearing disk, a pair of packing rings surrounding the hub receiving recesses, and adapted to bear against the two opposing clamping plates, a single spring interposed between said packing rings and adapted by its recoil to hold both of said packing rings in contact with said plates.

In testimony whereof I affix my signature in the presence of two witnesses.

JOSEPH P. OFFERMAN.

Witnesses:
  SAM ELSER,
  HILDA J. LIEBIG.